United States Patent
Ryu

(10) Patent No.: US 8,457,412 B2
(45) Date of Patent: Jun. 4, 2013

(54) METHOD, TERMINAL, AND COMPUTER-READABLE RECORDING MEDIUM FOR SUPPORTING COLLECTION OF OBJECT INCLUDED IN THE IMAGE

(75) Inventor: Ha Na Ryu, Gyeonggi-do (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/299,307

(22) Filed: Nov. 17, 2011

(65) Prior Publication Data

US 2012/0173227 A1 Jul. 5, 2012

(30) Foreign Application Priority Data

Jan. 4, 2011 (KR) .................. 10-2011-0000652

(51) Int. Cl.
*G06K 9/68* (2006.01)
*G06K 9/62* (2006.01)

(52) U.S. Cl.
USPC ........................................ 382/218; 382/209

(58) Field of Classification Search
USPC .............................................. 382/209–223
See application file for complete search history.

(56) References Cited

U.S. PATENT DOCUMENTS

| | | | |
|---|---|---|---|
| 2006/0238381 A1* | 10/2006 | Kimchi et al. ............. | 340/995.1 |
| 2008/0268876 A1* | 10/2008 | Gelfand et al. ............... | 455/457 |
| 2009/0216446 A1* | 8/2009 | Ma et al. ........................ | 701/213 |
| 2010/0260426 A1* | 10/2010 | Huang et al. .................. | 382/218 |
| 2010/0268451 A1* | 10/2010 | Choi .............................. | 701/201 |
| 2010/0325154 A1* | 12/2010 | Schloter et al. ............... | 707/770 |
| 2011/0098056 A1* | 4/2011 | Rhoads et al. ............. | 455/456.1 |
| 2011/0251903 A1* | 10/2011 | Ryu et al. ................... | 705/14.73 |

OTHER PUBLICATIONS

"Kooaba as Image Recognition Application for iPhone and Its Possibility," http://gemlove.tistory.com/401 (Jan. 26, 2010).

* cited by examiner

*Primary Examiner* — Samuel G Neway
(74) *Attorney, Agent, or Firm* — Blakely, Sokoloff, Taylor & Zafman LLP

(57) ABSTRACT

The present invention relates to a method for supporting a collection of an object included in a created image. The method includes the steps of: (a) creating an image of an object; (b) automatically creating and providing a combined sentence correct under the grammar of a language for the object on a first area on a screen of the terminal by using at least part of recognition information on what an identity of the object is, a place where the image was created and a time when the image was created, and automatically getting and providing a thumbnail corresponding to the recognized object on a second area on the screen of the terminal; and (c) if a Collection button is selected, storing data provided on the first and the second areas onto a storage space, to thereby complete the collection of the object.

19 Claims, 7 Drawing Sheets

METHOD, TERMINAL, AND COMPUTER-READABLE RECORDING MEDIUM FOR SUPPORTING COLLECTION OF OBJECT INCLUDED IN THE IMAGE

CROSS-REFERENCE TO RELATED APPLICATION

This application claims priority to and incorporates herein by reference all disclosure in Korean Patent Application No. 10-2011-0000652 filed Jan. 4, 2011.

TECHNICAL FIELD

The present invention relates to a method, a terminal and a computer-readable recording medium for supporting a collection of an object included in an image which is taken; and more particularly, to the method, the terminal and the computer-readable recording medium for supporting experiences of multiple users on the object included in the image and their information to be created very easily and shared very effectively by (i) recognizing the object, (ii) automatically creating and providing a grammatically combined sentence in a language as an auto comment for the object on a first area of a screen of a terminal by using at least part of the recognition information on what the identity of the object is, the place where the image was created and the time when the image was created, (iii) automatically getting and displaying a thumbnail corresponding to the recognized objet on the second area of the terminal screen, (iv) if a Collection button is selected, storing the data displayed on the first and second areas onto a storage space to thereby completing the collection of the object.

BACKGROUND OF THE INVENTION

Recently, due to the wide spread use of the Internet, it has been common to provide information converted to a digital form which was once offered in any printed material form such as books. As the information converted into digital data may be shared and delivered in real time by many users thanks to the spread of the Internet and a 3G network or other high-speed communications systems, it is widely used compared to printed materials which relatively lack information sharing and delivery.

In particular, a technology of providing several information forms through a method for augmented reality (AR) which displays supplementary information, including computer graphics (CG), texts, etc., combined on an inputted image taken in real time by a user terminal has been recently introduced. According to the AR technology, the technology may provide a better environment for the user because it may offer various icons including required information which may overlap each other visually on the screen through which the real world the user watches is displayed.

When several information sources are provided and shared by using the AR, it is actually difficult to determine the information on all objects included on an image photographed or inputted by a user terminal and effectively store the information. Even if the user wants to store only the information on the objects with relatively high interest (or high importance) differentially, it is complicate and vexatious to systematically record and store the information. Therefore, it is true that it has a certain degree of limits to lead the more active participation of the users.

SUMMARY OF THE INVENTION

It is an object of the present invention to solve all the problems mentioned above.

It is another object of the present invention to complete an auto comment by using the information of an object appearing in an image, including what the identity of an object is, the place where the image was created and the time when the image was created, etc.; automatically acquire and display data including a thumbnail image, etc. corresponding to the object, and store the information on numerous objects around the user systematically and easily by simply selecting a collection button.

It is still another object of the present invention to allow the user to share information on other users' collections based on the easily collected information on the various objects included in the created images to thereby provide the user with information appropriate to the user's preference.

In accordance with one aspect of the present invention, there is provided a method for supporting a collection of an object included in a created image including the steps of: (a) creating an image of an object by using a terminal; (b) (i) automatically creating and providing a combined sentence correct under the grammar of a language as an auto comment for the object on a first area on a screen of the terminal by using at least part of recognition information on what an identity of the object is, a place where the image was created and a time when the image was created, and (ii) automatically getting and providing a thumbnail corresponding to the recognized object on a second area on the screen of the terminal, in order to support for performing a collection of the object; and (c) if a Collection button is selected, storing data (i.e., collection page) provided on the first and the second areas onto a storage space, to thereby complete the collection of the object.

In accordance with another aspect of the present invention, there is provided a terminal for supporting a collection of an object included in a created image including: an image taking part for creating an image of an object; an auto comment creating part for automatically creating and providing a combined sentence correct under the grammar of a language as an auto comment for the object on a first area on a screen thereof by using at least part of recognition information on what an identity of the object is, a place where the image was created and a time when the image was created; a correspondence image selecting part for automatically getting and providing a thumbnail corresponding to the recognized object on a second area on the screen thereof; and a collection performing part for storing data (i.e., collection page) provided on the first and the second areas onto a storage space if a Collection button is selected, to thereby complete the collection of the object.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
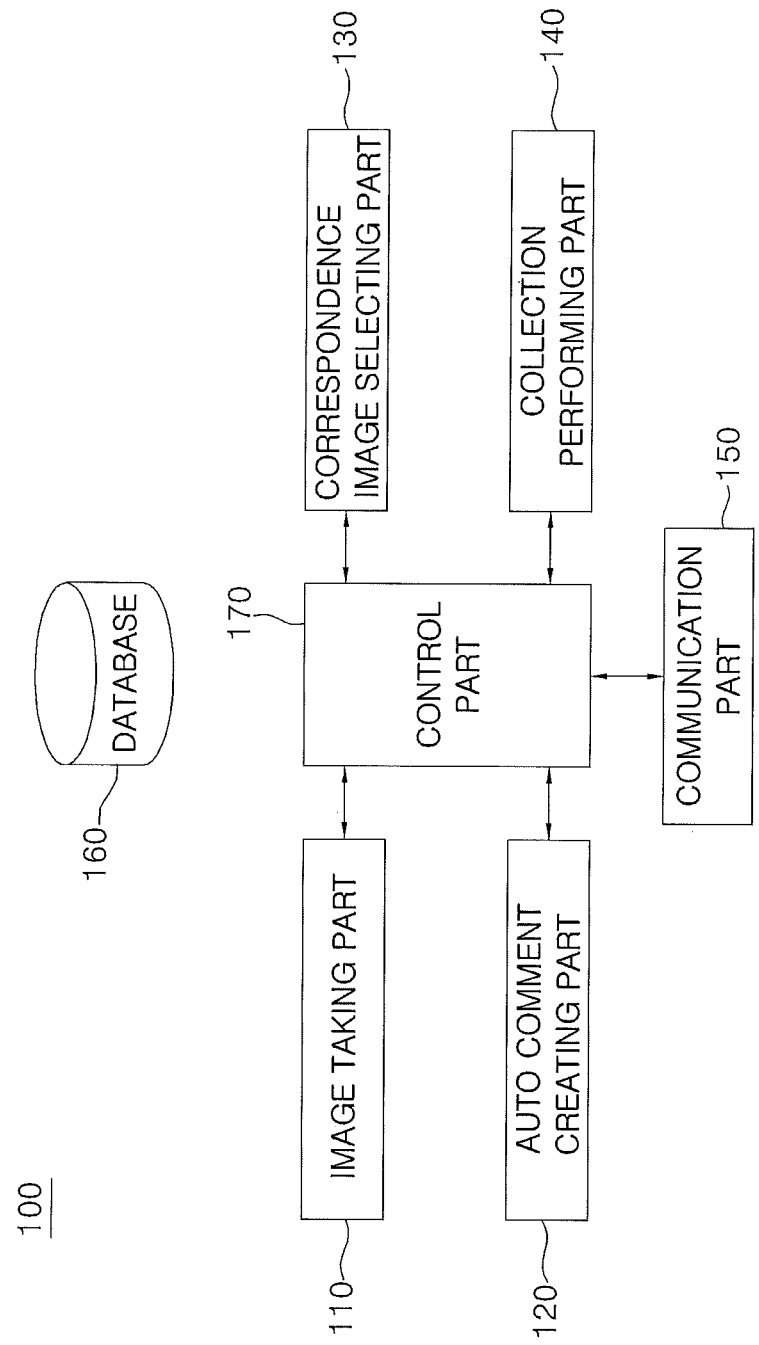
FIG. 1 is a block diagram which exemplarily represents the internal configuration of a terminal in accordance with an example embodiment of the present invention.

The detailed description of the present invention illustrates specific embodiments in which the present invention may be performed by reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

A "collection" herein may be defined as a series of processes of collecting and storing an auto comment made by use of at least part of the information on the identity of a specific object which contains its type, property, etc. appearing in an image, the information on the place where the image was created and information on the time when the image was created and/or a thumbnail image corresponding to the specific object, etc. For instance, if a movie poster is included in an inputted image, a series of processes of recognizing the poster as the target object of the collection and storing (i) an auto comment including a combined sentence correct under the grammar of a language from the information on the movie corresponding to the poster (including its synopsis, director, lead actor or actress, etc.), the information on the place where the image of the poster was taken and the information on the time when the image of the poster was created, and/or (ii) a thumbnail image of the poster, etc. fall under the "collection" for the movie poster.

FIG. 1 is a block diagram which exemplarily represents the internal configuration of a terminal in accordance with an example embodiment of the present invention.

As illustrated in FIG. 1, a terminal 100 in accordance with an example embodiment of the present invention may include an image taking part 110, an auto comment creating part 120, a correspondence image selecting part 130, a collection performing part 140, a communication part 150, a database 160 and a control part 170.

The image taking part 110 may include a camera for taking an image inputted from outside to thereby create the image. Furthermore, the image taking part 110 may determine whether there is an object to be a target of a collection included in the image.

If it is considered that the object to be a target of a collection is included in the taken image, the auto comment creating part 120 may collect the information on the object and automatically complete an auto comment. As an example embodiment, the completed auto comment includes the information on the identity of the object which contains its type, name, application, etc., the information on the place where the image with the object was taken, the information on the time when it was taken and the like.

Further, if it is considered that the object to be a target of a collection is included in the taken image, the correspondence image selecting part 130 may select a thumbnail image corresponding to the object. The detailed method therefor will be explained below. The selected thumbnail image may be automatically displayed on the screen of the terminal 100 with the auto comment completed by the auto comment creating part 120.

In a state of the auto comment and the thumbnail image for the target object of the collection having been automatically provided on the screen, if a Collection button is selected by the user, the collection performing part 140 may complete the collection of the object by storing the auto comment and the thumbnail image to be explained below onto the database 160.

In accordance with an example embodiment of the present invention, it is also possible to provide information on relationships between a specific user and other users who collected an object(s) same as, or similar to, that(those) collected by the specific user in connection with a social network service (SNS). For example, it will be possible to acquire information on other users with same or similar preference with the specific user by referring to the identity(ies) of the collected objects, a category(ies) to which the objects pertain, a location(s) where the objects were collected, the time(s) when the objects were collected, etc. and give a service for recommending information on other users who have a preference same as or similar to that of the specific user. To provide such service, the terminal 100 may additionally equip a module such as a separate human relationships inferring part (not illustrated).

Figure 2:
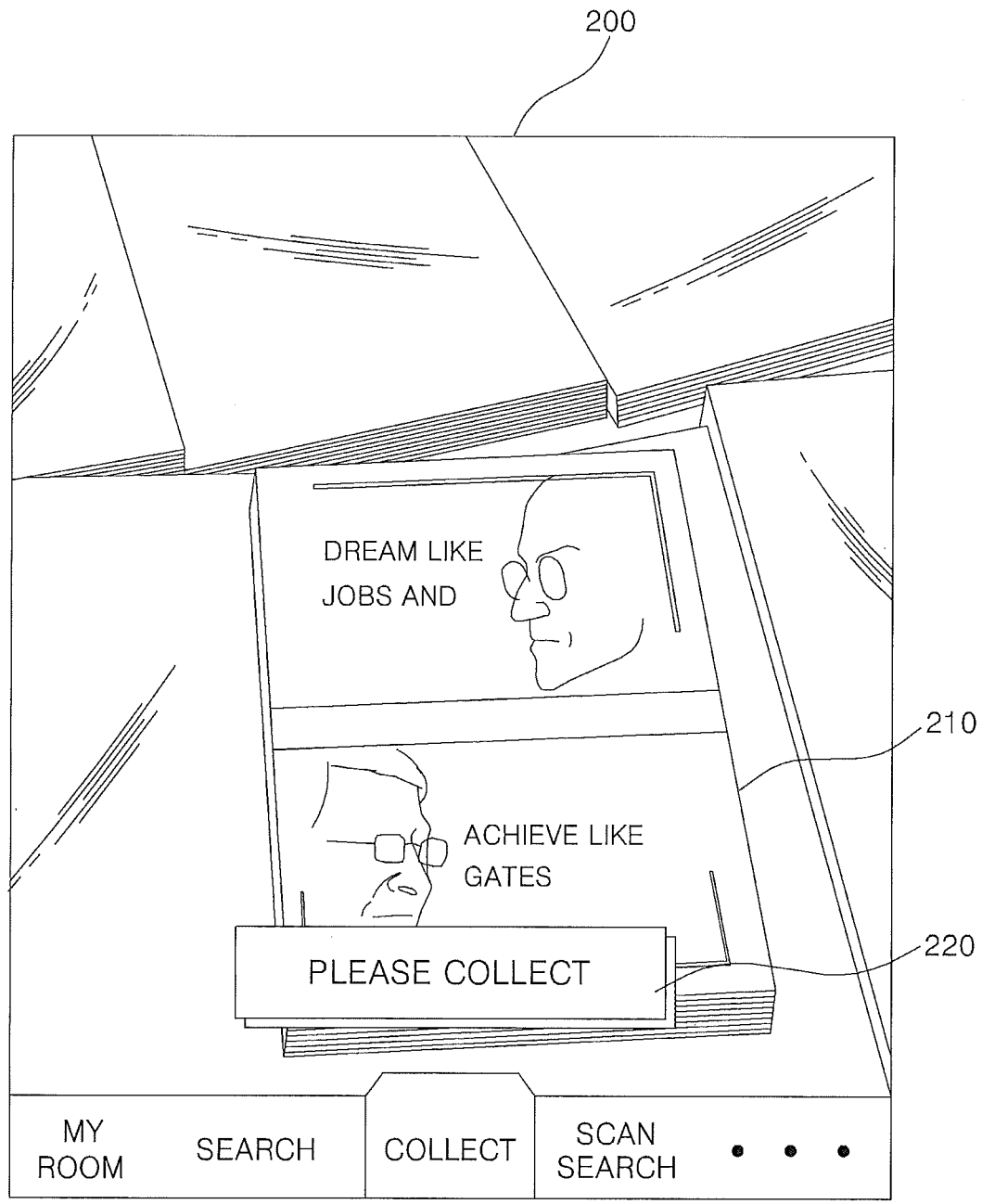
FIG. 2 is a drawing for explaining a process of getting an image included in an object in an example embodiment of the present invention.

FIG. 2 is a drawing for explaining a process of getting an image included in an object in a method in accordance with an example embodiment of the present invention.

By reference to FIG. 2, an image 200 to be taken by the image taking part 110 may be displayed on the screen of the terminal 100. As illustrated on FIG. 2, an icon 220 which provides a function for taking an image for the collection is displayed and, if the user selects the icon 220, it will be possible to take the image 200 displayed on the screen.

If the image 200 is taken, the image taking part 110 determines whether an object 210 to be a target of the collection included in the image 200 or not. The object 210 may be directly selected by the user or automatically selected on the image 200 by an object recognition technology, an optical character recognition (OCR) technology or a barcode recognition technology. For the reason that the user frequently generally takes the image 200 while placing the object 210 which the user wants to collect closely to the center of the image 200, it may be possible to allow the object 210 on the center of the image 200 to be recognized as a target of the collection, as illustrated in FIG. 2.

On the other hand, in the example embodiment, a case in which a book is recognized as the object 210, the target of the collection, is explained as an example.

Figure 3:
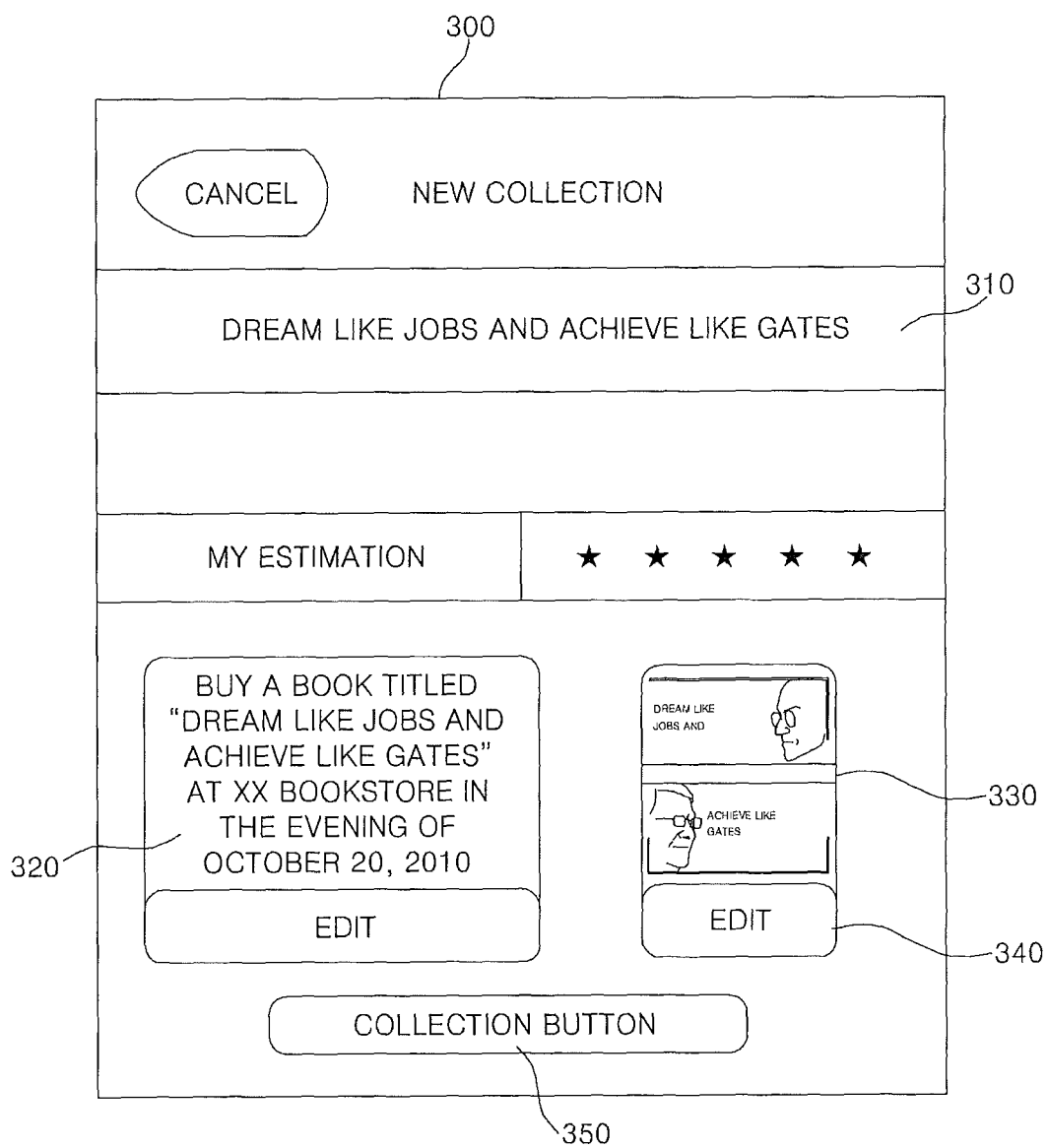
FIG. 3 is a drawing for explaining a process of displaying an auto comment and a thumbnail image in an example embodiment of the present invention.

FIG. 3 is a drawing for explaining a process of automatically displaying an auto comment and a thumbnail image in accordance with an example embodiment of the present invention.

By reference to FIG. 3, to support the collection for the object 210 which is the target of the collection, it may use at least part of recognition information on the identity (i.e., the title of a book) of the object 210 is, the place where the image including the object 210 was created (i.e., xx Bookstore) and the time when the image was created (i.e., Oct. 20, 2010) to automatically create and display a combined sentence correct under the grammar of the language as an auto comment for the object 210 (i.e., Purchased "Dream Like Jobs and Achieve Like Gates" at xx Bookstore in the evening on Oct. 20, 2010) on a first area 320 of a terminal screen 300, and automatically get and display a thumbnail corresponding to the recognized object 210 on a second area 330 of the terminal screen 300.

At the time, the title of the book (i.e., Dream Like Jobs and Achieve Like Gates), appearing on the area 320, may also appear on an area 310. Because the area 310 may be considered as an area for displaying the recognition information on the identity of the object, the area 310 would also be treated as the first area with the area 320. In short, the first area may include the area 310 and the area 320.

The thumbnail provided on the second area 330 may be directly acquired from the created image or indirectly acquired from the pre-stored images corresponding to the object included in the created image, which was recognized by using at least one of the object recognition technology, the optical character recognition (OCR) technology or the barcode recognition technology.

Thereupon, if a Collection button 350 is simply selected, the collection page including the title 310, the auto comment 320, the thumbnail 330 and the like, automatically displayed on the first and second areas of the screen 300, can be stored onto the database 160.

If the object as the target of the collection in the image 200 is incorrectly selected, the user may tap a Cancel button on the top of the screen 300 to return to the previous page.

If the object is correctly selected but the auto comment 320 or the thumbnail 330 is incorrectly provided or it is necessary to add content to the auto comment 320 or the thumbnail 330, the user may select the area(s) where the auto comment 320 or the thumbnail 330 is displayed on the screen 300 to edit the auto comment 320 or the thumbnail 330. Detailed explanation will be made below by reference to FIGS. 6 and 7.

Figure 4:
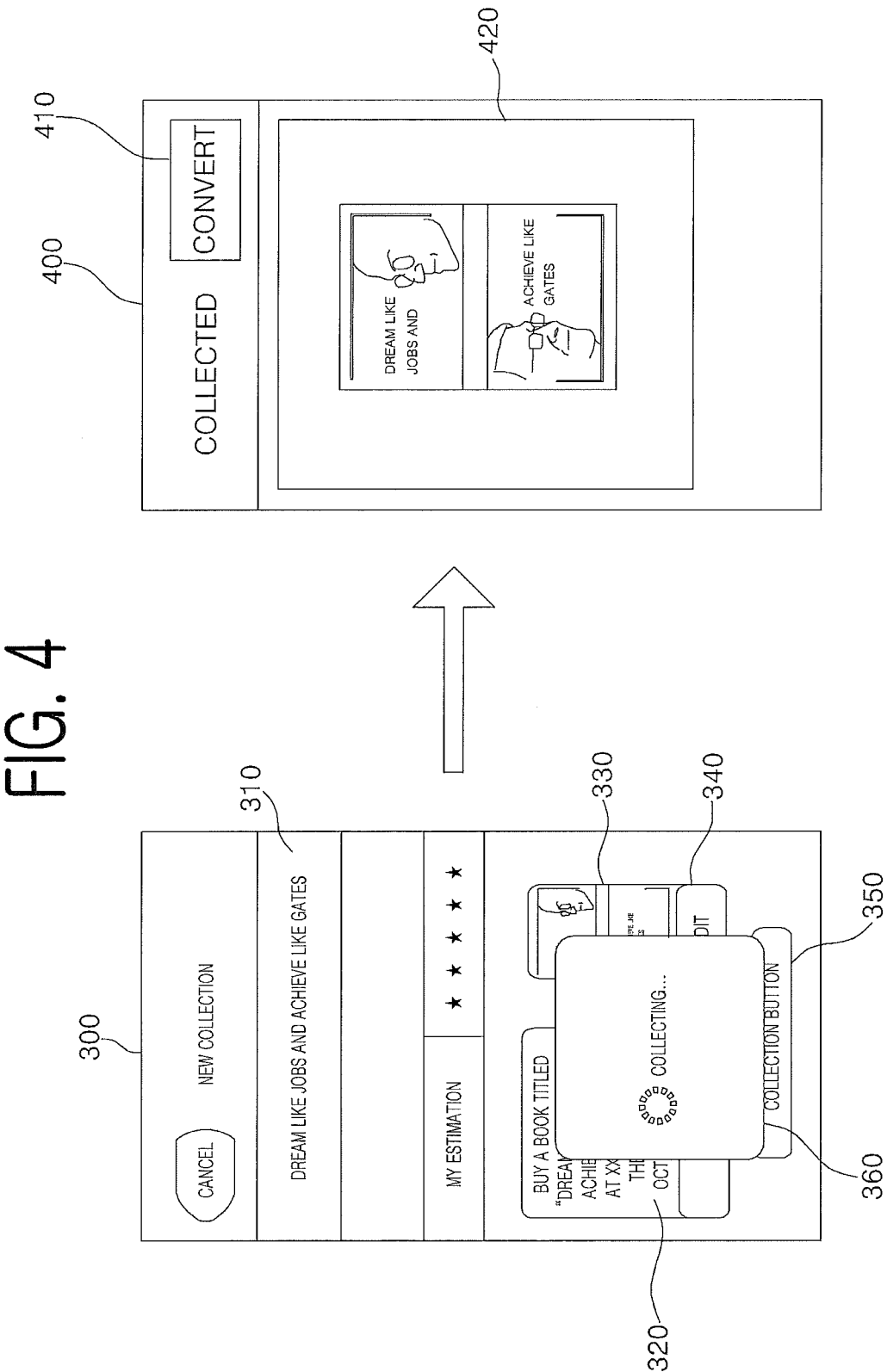
FIG. 4 is a diagram for describing a process of performing a collection for the object in an example embodiment of the present invention.

FIG. 4 is a diagram for describing a process of performing a collection for the object in accordance with an example embodiment of the present invention.

If the user checks the data of the collection page, including the auto comment 320, the thumbnail 330, etc. as displayed on the screen 300 and tap the Collection button 350 to perform the collection, a "Collecting" image 360 is displayed for showing the user a course of storing the data of the collection page onto the database 160.

If the storing process is completed, a display 400 which informs the storing process was completed appears. It is possible to display an image 420 corresponding to the thumbnail 330 of the object targeted for the collection on the display 400. On the top, a Convert button 410 which allows the user to confirm the completion of the collection and move to another screen is displayed.

Figure 5:
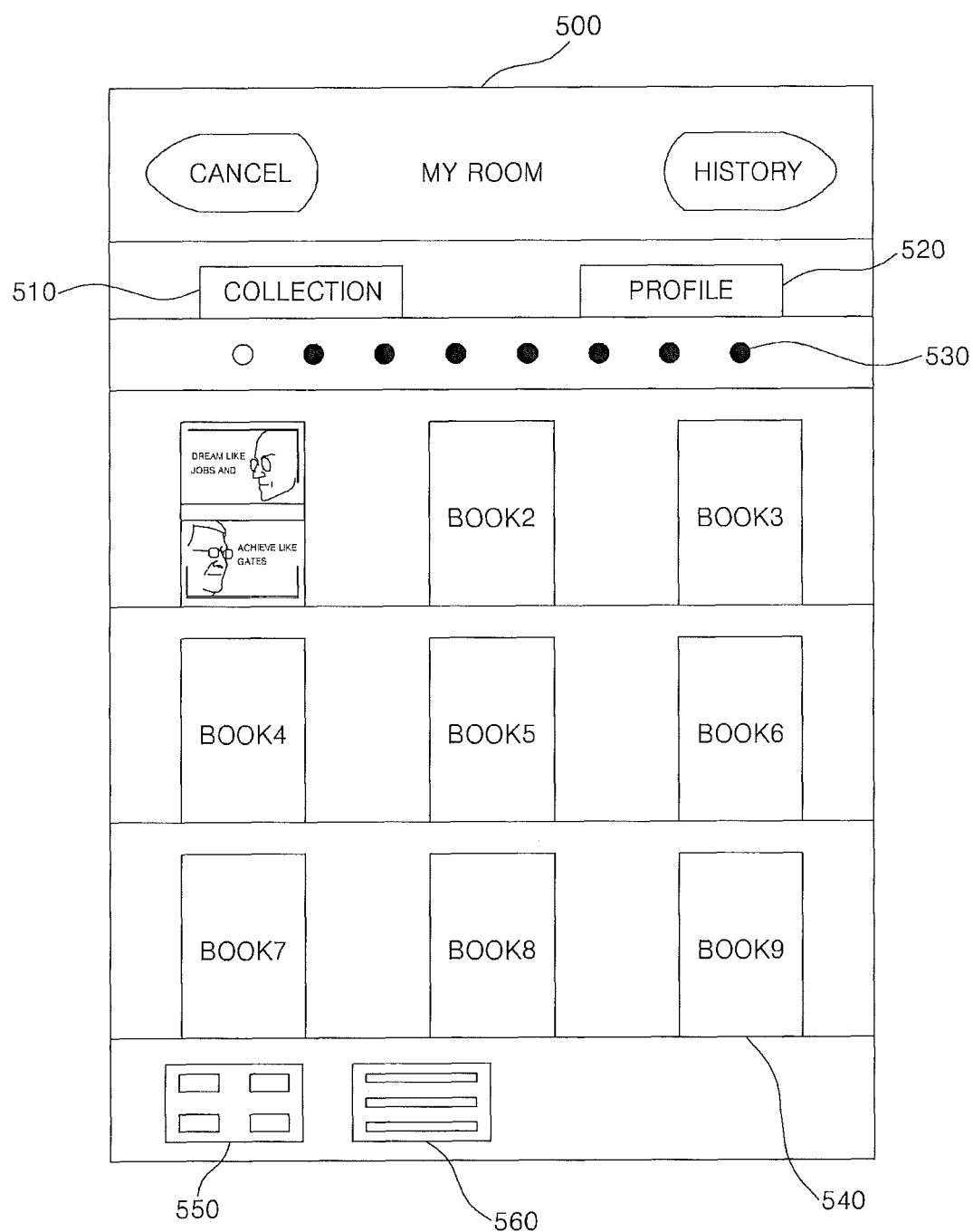
FIG. 5 is a diagram for illustrating a process of managing the collected object in an example embodiment of the present invention.

FIG. 5 is a diagram for illustrating a process of managing the collected object in accordance with an example embodiment of the present invention.

By reference to FIG. 5, "My Room", where objects collected by a specific user are displayed as if books 540 are displayed on a bookshelf, i.e., a management screen 500, is shown. At this time, if multiple users are accessible to the database 160, a virtual space, where each user may manage the data of the objects which each user collected, may be allotted to each user. For efficiency and accessibility to data, the collected information, furthermore, may be separated and managed by each user.

The image of each book 540 displayed on the bookshelf corresponds to each collected object. If each collected object is a book as illustrated in FIG. 2, the image of the book 540 thereby may be an actual cover of the book and if the object is a movie, the movie's poster, etc. may be displayed on the bookshelf. The user may tap a Collection button 510 on the top of the management screen 500 to view the management screen 500 displayed in a form of bookshelf or tap a Profile button 520 to check the profile of the user who completed the collection, detailed information on the collection or the like.

As illustrated in FIG. 5, the management screen 500 may display each collection object as a book 540-shaped icon or in a form of a sentence representing the typical characteristics of each collection object (the object name, the location where the collection was performed, the time when the collection was performed, etc.). The object may be selected after tapping either an icon-shaped button 550 or a sentences-type button 560 on the bottom of the management screen 500, but it will not be limited thereto.

Figure 6:
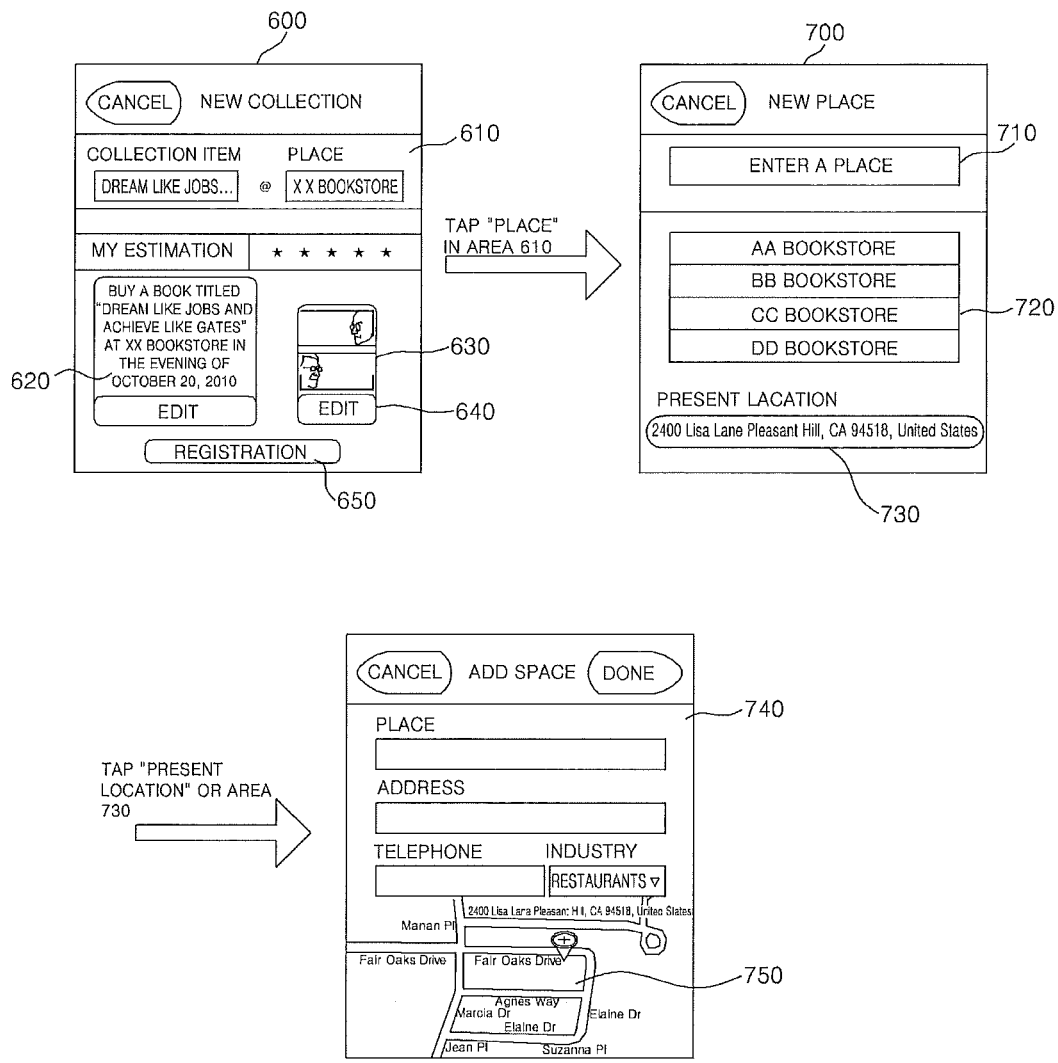
FIG. 6 is a drawing for explaining a process of editing the auto comment of the object in an example embodiment of the present invention.

FIG. 6 is a drawing for explaining a process of editing the auto comment of the object in accordance with an example embodiment of the present invention.

By reference to FIG. 6, a screen 600 on which the data of an auto comment 620 and thumbnail 630 of an object is newly collected is displayed. On the top of the screen 600, a type (or name) of the object for the collection and the location where the collection was performed are displayed as representative information 610. Just as shown in FIG. 3, on the bottom of the screen 600, a Collection button 650 for registering a collection page is displayed.

If a user considers the location where the collection was performed is wrongly provided in the representative information 610 and then taps the area displaying "xx Bookstore" located on the right side in the representative information 610 to edit it, a location editing screen 700 as illustrated at the second place on FIG. 6 is displayed. On the location editing screen 700, an entry button 710 where the user may directly enter a location, a list button 720 where the list of POIs registered around the location is displayed as a candidate and information on the present location 730 are displayed.

If the user taps the entry button 710 to enter the location directly, a keypad may be displayed to help the user to enter characters on the screen. In addition, if the user selects a specific item on the list button 720 and taps it, the selected item is applied to the location where a new collection was performed.

As well, if the user taps the present location information 730 to add the present location, it may be possible to make an entry window 740 where name, address, phone number, etc. of the present location may be entered and a map 750 in a certain scale where the present location is displayed appear. The user may check where the user is located on the map 750 and then drag the map to edit the location or enter location information which the user wants on the entry window 740 by referring to the present location appearing on the map.

If the entry is completed, the location information edited by the user appears on the representative information 610 of the screen 600 and the location where the collection was performed included in the auto comment 620 may also be modified and then displayed again. As explained above in FIG. 3, it is needless to say that the user may tap the screen area where the auto comment 620 is displayed and edit the auto comment 620 directly.

Figure 7:
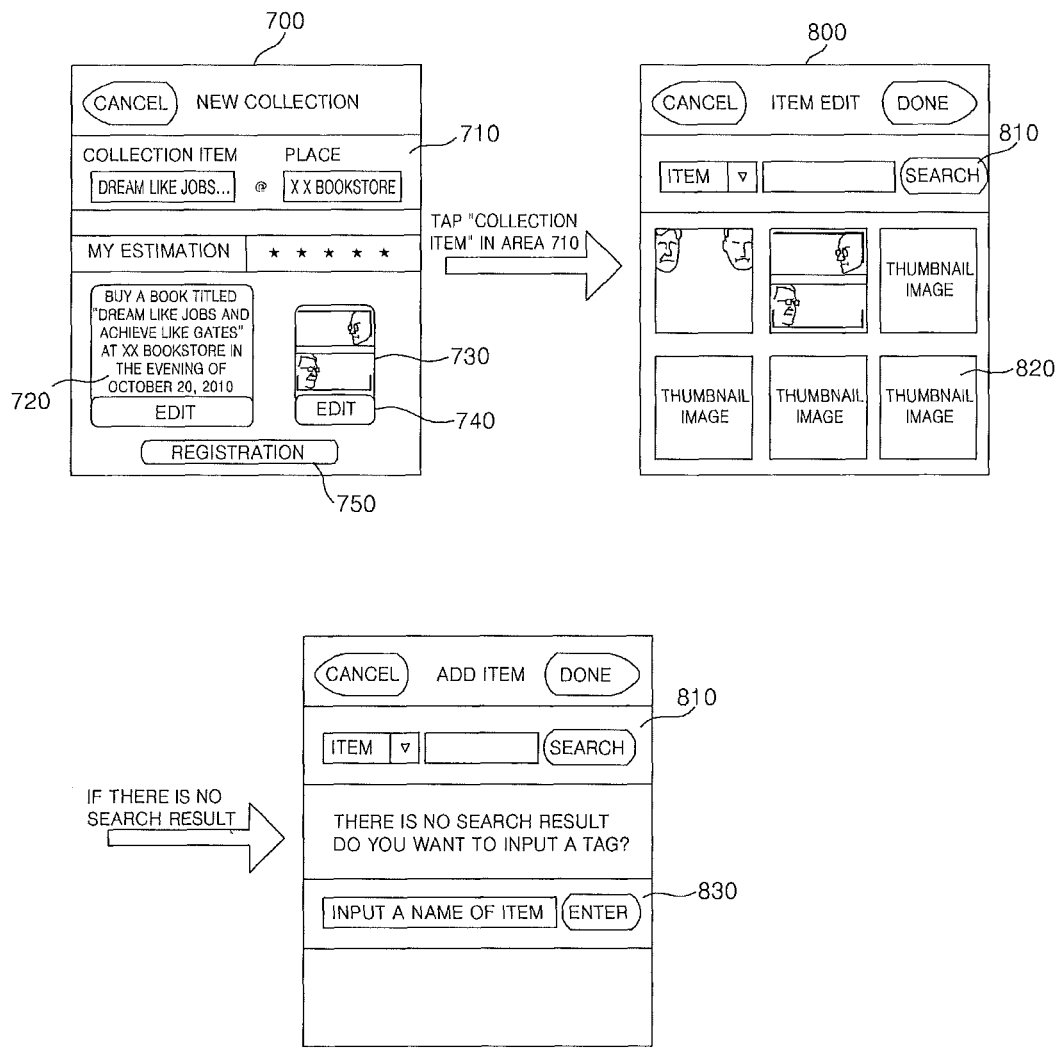
FIG. 7 is a diagram for interpreting a process of editing the thumbnail of the object in an example embodiment of the present invention.

FIG. 7 is a diagram for interpreting a process of editing the thumbnail of the object in accordance with an example embodiment of the present invention.

If the user intends to edit the thumbnail 730 of the object as the target for the collection displayed on the screen because the thumbnail is not appropriate, the user will tap the screen area, where the thumbnail 730 is displayed, or an Edit button 740 on the bottom thereof. If the user taps it, an image editing screen 800 is displayed to allow the user to edit or modify the thumbnail 730.

On the image editing screen 800, an object search button 810 with which the user may select the type of the object for the collection or enter the name of the object directly is provided. If the user selects the type of the object or enters the name directly and then taps the object search button 810, a list 820 of images corresponding to the query inputted by the user may be browsed and displayed on the screen.

If the thumbnail the user wants exists on the list 820, the user may select the corresponding image from the list 820. If the thumbnail the user wants does not exist on the list 820, a tag input window 830 for helping the user to enter a tag directly may be offered.

Next, the communication part 150 in accordance with one example embodiment of the present invention may perform a function of allowing the terminal 100 to communicate with an external device.

In accordance with one example embodiment of the present invention, the database 160 is a concept of a database not only in a narrow meaning but also in a broad meaning which include data records, etc. based on computer file systems. From the aspect, it must be understood that, if even a set of simple operation processing logs is browsed and data is extracted from the set, it may be included in a database as stated in the present invention. The database 160 is illustrated in FIG. 1 as if it is included in the terminal 100, but the database 160 may be possibly configured separately from the terminal 100 at the necessity of a person skilled in the art who implements the present invention.

Furthermore, the control part 170 in accordance with one example embodiment of the present invention may perform a function of controlling data flow among the image taking part 110, the auto comment creating part 120, the correspondence image selecting part 130, the collection performing part 140, the communication part 150 and the database 160. In short, the control part 170 in accordance with the present invention may control the flow of data from/to outside or among the component of the terminal 100 to force the image taking part 110, the auto comment creating part 120, the correspondence image selecting part 130, the collection performing part 140, the communication part 150 and the database 160 to perform their unique functions.

In accordance with the present invention, it is possible to automatically complete a combined sentence correct under the grammar of a language by using the information on what an object included in a created image is, the place where the image was created, the time when the image was created, etc. and automatically display a thumbnail image corresponding to the object to thereby allow a user to collect information on the object the user wants very simply and conveniently without complicatedly editing information.

In accordance with the present invention, the user may collect a number of objects scattered around the user very easily, and more particularly, if the user presses a Take Photo button toward the object around the user and then taps a Collection button for registering the auto comment and the thumbnail image which are automatically provided (in short, only if the user presses buttons twice), the user may systematically collect the information on the object and this may lead more active participation of the user.

Furthermore, in accordance with the present invention, the users may perform the collections for a various objects very easily and therefore thanks to the explosive increases in the information on the collections, the users may build a true social network by acquiring the information on the relationships between other users more accurately.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.)

Accordingly, the thought of the present invention must not be confined to the explained embodiments, and the following patent claims as well as everything including variations equal or equivalent to the patent claims pertain to the category of the thought of the present invention.

What is claimed is:

1. A method for supporting a collection of an object included in a created image comprising the steps of:

creating an image of an object by using a terminal;

automatically creating and providing a combined sentence correct under the grammar of a language as an auto comment for the object on a first area on a screen of the terminal by using at least part of recognition information on what an identity of the object is, a place where the image was created and a time when the image was created, and automatically getting and providing a thumbnail corresponding to the recognized object on a second area on the screen of the terminal; and if a collection button is selected, storing data provided on the first and the second areas onto a storage space as a collection page, to complete the collection of the object, wherein each image relating to each collected object by a user for a period of time is made as a book image and displayed as if being displayed on a bookshelf through a virtual space.

2. The method of claim 1 further comprising getting information on relationships with respect to preferences of users who collect same or similar objects, using multiple terminals, by referring to the collection information acquired from the multiple terminals.

3. The method of claim 1 wherein the first area consists of multiple areas divided in space.

4. The method of claim 1 wherein the sentence provided on the first area is provided to be editable.

5. The method of claim 1 wherein the thumbnail provided on the second area is acquired directly from the created image or indirectly from a pre-stored image corresponding to the recognized object included in the created image.

6. The method of claim 1 wherein the recognition information on the identity of the object is acquired by applying at least one of an object recognition technology, an optical character recognition (OCR) technology or a barcode recognition technology.

7. The method of claim 1 wherein the collection page is stored to be managed by a user who collects the object.

8. The method of claim 7 wherein the virtual space is a unique virtual space is allotted to each user to allow the user to manage the collection page.

9. The method of claim 1 wherein, if the recognition information on the place displayed on the first area is inappropriate, points of interests (POIs) relating information around the recognized place is provided to support for selecting a POI directly or information on a present location is provided to support for registering the present location as a new POI.

10. A terminal for supporting a collection of an object included in a created image comprising:
- an image taking part for creating an image of an object;
- an auto comment creating part for automatically creating and providing a combined sentence correct under the grammar of a language as an auto comment for the object on a first area on a screen thereof by using at least part of recognition information on what an identity of the object is, a place where the image was created and a time when the image was created;
- a correspondence image selecting part for automatically getting and providing a thumbnail corresponding to the recognized object on a second area on the screen thereof; and
- a collection performing part for storing data provided on the first and the second areas onto a storage space as a collection page if a Collection button is selected, to complete the collection of the object, wherein each image relating to each collected object by a user for a period of time is made as a book image and displayed as if being displayed on a bookshelf through a virtual space.

11. The terminal of claim 10 further comprising a human relationships-inferring part for getting information on relationships with respect to preferences of users who collect same or similar objects, using multiple terminals, by referring to the collection information acquired from the multiple terminals.

12. The terminal of claim 10 wherein the first area consists of multiple areas divided in space.

13. The terminal of claim 10 wherein the auto comment creating part is provided to allow the sentence provided to be editable on the first area.

14. The terminal of claim 10 wherein the correspondence image selecting part acquires the thumbnail provided on the second area directly from the created image or indirectly from pre-stored images corresponding to the recognized object included in the created image.

15. The terminal of claim 10 wherein the auto comment creating part acquires recognition information on the identity of the object by applying at least one of an object recognition technology, an optical character recognition (OCR) technology or a barcode recognition technology.

16. The terminal of claim 10 wherein the collection performing part stores the collection page onto the storage space to be managed by a user who collects the object.

17. The terminal of claim 16 wherein the virtual space is a unique virtual space is allotted to each user to allow the user to manage the collection page in the storage space.

18. The terminal of claim 10 wherein, if the recognition information on the place displayed on the first area is inappropriate, points of interests (POIs) relating information around the recognized place is provided to support for selecting a POI directly or information on a present location is provided to support for registering the location as a new POI.

19. One or more non-transitory computer-readable recording media having stored thereon a computer program that, when executed by one or more processors, causes the one or more processors to perform acts including:
- creating an image of an object by using a terminal;
- automatically creating and providing a combined sentence correct under the grammar of a language as an auto comment for the object on a first area on a screen of the terminal by using at least part of recognition information on what an identity of the object is, a place where the image was created and a time when the image was created, and
- automatically getting and providing a thumbnail corresponding to the recognized object on a second area on the screen of the terminal; and
- if a collection button is selected, storing data provided on the first and the second areas onto a storage space as a collection page, to complete the collection of the object, wherein each image relating to each collected object by a user for a period of time is made as a book image and displayed as if being displayed on a bookshelf through a virtual space.

* * * * *

UNITED STATES PATENT AND TRADEMARK OFFICE
CERTIFICATE OF CORRECTION

PATENT NO.         : 8,457,412 B2                                    Page 1 of 1
APPLICATION NO.    : 13/299307
DATED              : June 4, 2013
INVENTOR(S)        : Ryu It is certified that error appears in the above-identified patent and that said Letters Patent is hereby corrected as shown below:

In the Claims

In column 10, at line 27 delete, "points of interests (POIs) relating" and insert --POIs-relating--.

Signed and Sealed this
Twenty-eighth Day of January, 2014

Michelle K. Lee
*Deputy Director of the United States Patent and Trademark Office*